Dec. 11, 1928.  
C. O. THORNE  
PAPER CUTTER  
Filed April 9, 1927    2 Sheets-Sheet 1

1,694,896

INVENTOR  
Clarence O. Thorne  
BY  
Chappell Earl  
ATTORNEYS

Dec. 11, 1928.

C. O. THORNE

PAPER CUTTER

Filed April 9, 1927 2 Sheets-Sheet 2

1,694,896

INVENTOR
Clarence O. Thorne
BY
Chappell & Earl
ATTORNEYS

Patented Dec. 11, 1928.

1,694,896

UNITED STATES PATENT OFFICE.

CLARENCE O. THORNE, OF WATERVLIET, MICHIGAN.

PAPER CUTTER.

Application filed April 9, 1927. Serial No. 182,340.

The main objects of this invention are:

First, to provide in a paper cutter an improved means for squaring the sheets so that they may be accurately cut.

Second, to provide a structure having these advantages which is very rapidly manipulated to gage the sheets so that they are cut to true rectangular form.

Objects pertaining to details and economies of my invention will definitely appear from the description to follow. The invention is defined in the claims.

A structure embodying the features of my invention is clearly illustrated in the accompanying drawing, in which.

Figure 1:
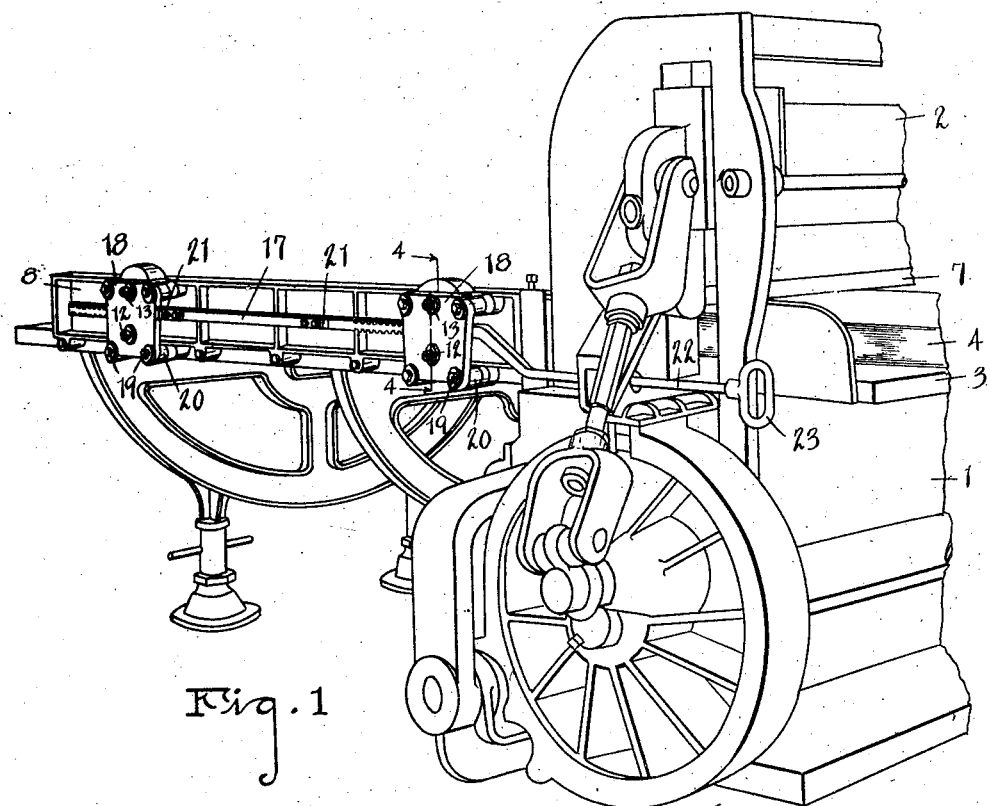
Fig. 1 is a fragmentary perspective view of a paper cutting machine embodying the features of my invention.
Figure 4:
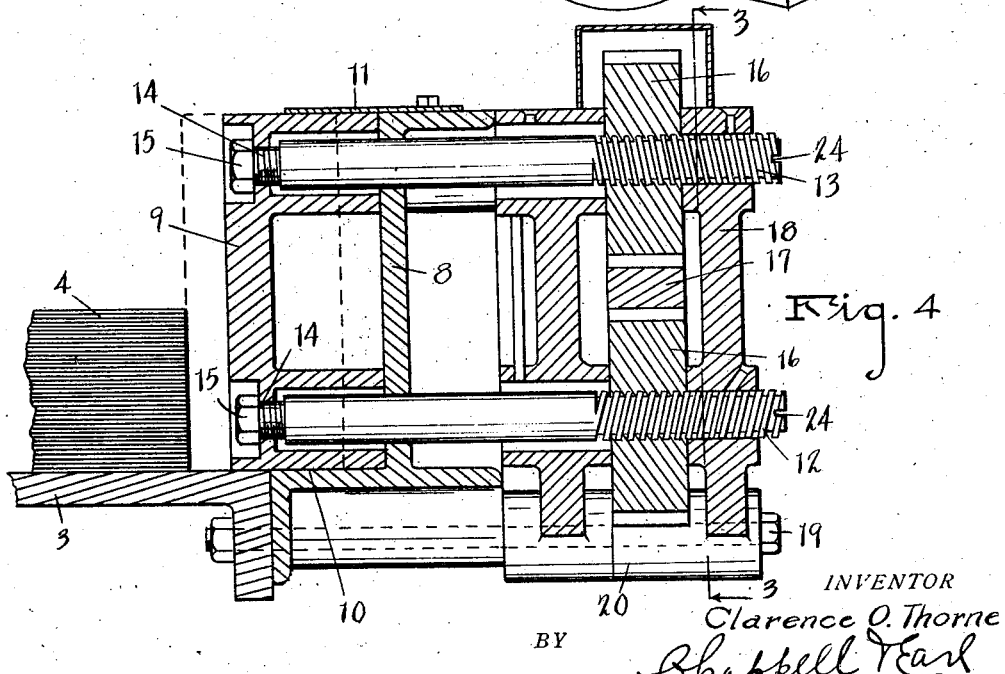
Fig. 4 is a detail view in section on a line corresponding to line 4—4 of Figs. 1, 2 and 3.
Figure 2:
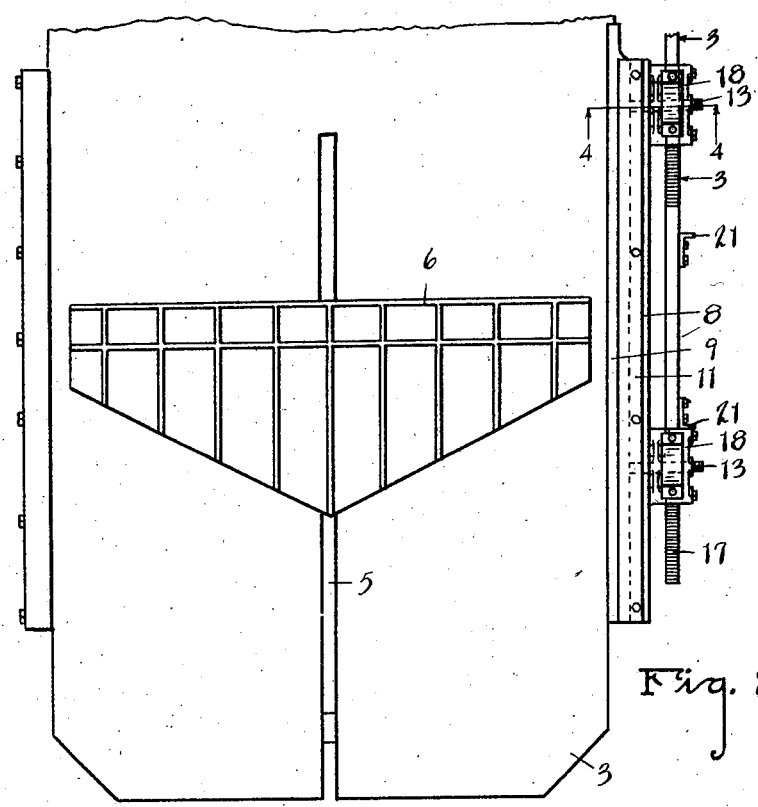
Fig. 2 is a fragmentary plan view of the table.
Figure 3:
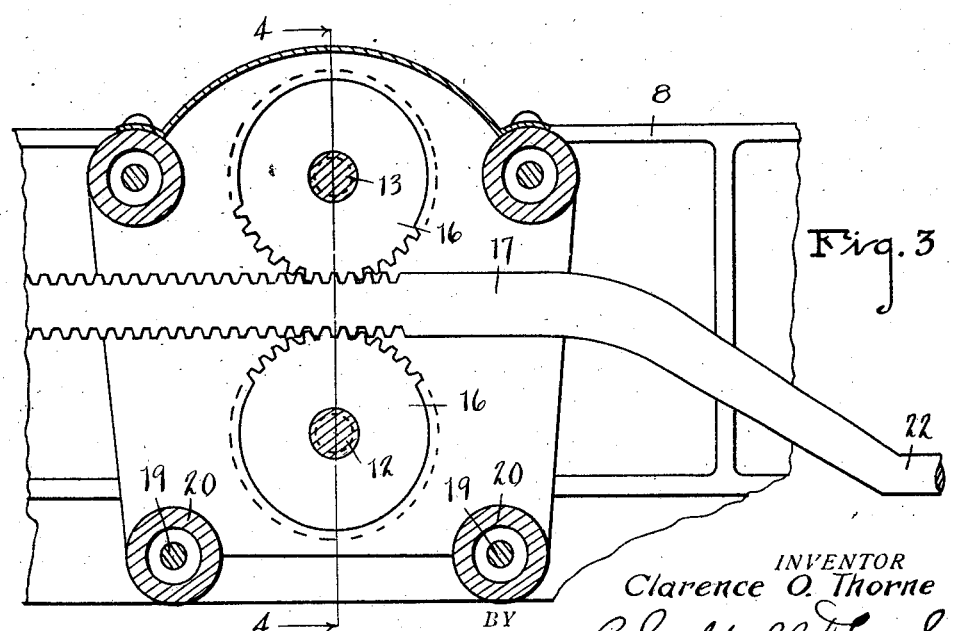
Fig. 3 is a detail section on line 3—3 of Figs. 2 and 4.

Referring to the drawing, 1 represents the frame of the machine in which the cutter head 2 is mounted for vertical reciprocating movement. The details of the actuating means for the cutter head form no part of this invention and therefore are not further described.

The table 3 projects at one side of the machine for the arrangement of the sheets thereon, the sheets being conventionally illustrated at 4. The table has a longitudinal slot 5 therein in which the gage 6 is adjustably mounted. This gage 6 is also of standard type and is disposed with its face parallel to the cutter 7.

At the side of the table I mount a support 8 for the gage bar 9. This support 8 has an angled face, the horizontal portion 10 of the face being in the plane of the surface of the table so that the gage bar 9 reciprocates or slides on this horizontal face and on the face of the table.

A retaining plate 11 is mounted on the support 8 to overlap the upper edge of the gage bar. The gage bar is adjustably supported by means of the screws 12 and 13 which are arranged in pairs, the screws of the pairs being oppositely threaded. These screws are threaded into the gage bar at 14 and are secured in their adjusted positions by means of the lock nuts 15. The outer ends of the screws are slotted at 24 so that the screws may be adjusted from their outer ends to aline the gage bar and to compensate for any wear that may occur in use or any slight irregularities in manufacture.

The screws are provided with pinions 16 which have threaded engagement with the screws, the rack bar 17 being arranged between the pinions so that by reciprocating the bar the screws are simultaneously adjusted. The pinions are supported against outward thrust by the plates 18 which are supported in spaced relation to the support 8 by means of the screws 19 and spacers 20.

Stops 21 are provided on the rack bar to limit the stroke. The rack bar has a handle extension 22 at one end terminating in the hand piece 23 so that the operator may manipulate the same from the front of the machine.

With the parts thus arranged the sheets may be rapidly trimmed to true rectangular form, a stack of sheets being lined up by the gage bar which constitutes a jogger.

I have illustrated and described my improvements in an embodiment which has proven very satisfactory. I have not attempted to illustrate modifications and adaptations which I contemplate as I believe the disclosure made will enable those skilled in the art to embody or adapt my improvements as may be desired.

Having thus described my invention what I claim as new and desire to secure by Letters Patent is:

1. In a structure of the class described including a cutter and a table operatively associated therewith, the combination of a gage support mounted at the side of the table and having an angled face, the horizontal portion of which is disposed in a plane flush with the surface of the table, a gage bar slidably mounted on said support, adjusting screws slidable in said support and adjustably connected to said gage bar, adjusting pinions having threaded engagement with said screws, a rack bar coacting with said pinions whereby they are simultaneously rotated as the rack bar is reciprocated, and a second gage adjustably mounted on said table at right angles to said gage and in parallel relation to said cutter.

2. In a structure of the class described including a cutter and a table operatively associated therewith, the combination of a gage support mounted at the side of the table, a gage bar, adjusting screws slidable in said support and adjustably connected to said gage bar, adjusting pinions having threaded engagement with said screws, a rack bar coacting with said pinions whereby they are simultaneously rotated as the rack bar is reciprocated, and a second gage adjustably mounted on said table at right angles to said gage and in parallel relation to said cutter.

3. In a structure of the class described, the combination of a table, a gage support mounted at the side of the table and having an angled face, the horizontal portion of which is disposed in a plane flush with the surface of the table, a gage bar slidably mounted on said support, pairs of oppositely threaded adjusting screws slidable in said support and connected to said gage bar, pairs of adjusting pinions having threaded engagement with said screws, a rack bar arranged between said pairs of pinions whereby they are simultaneously rotated as the rack bar is reciprocated, and a second gage adjustably mounted on said table at right angles to said gage bar.

4. In a structure of the class described, the combination of a table, a gage support mounted at the side of the table, a gage bar, pairs of oppositely threaded adjusting screws slidable in said support and adjustably connected to said gage bar, pairs of adjusting pinions having threaded engagement with said screws, a rack bar arranged between said pairs of pinions whereby they are simultaneously rotated as the rack bar is reciprocated, and a second gage adjustably mounted on said table at right angles to said gage bar.

5. In a structure of the class described, the combination of a table, a gage support mounted at the side of the table, a gage bar, pairs of oppositely threaded adjusting screws slidable in said support and adjustably connected to said gage bar, pairs of adjusting pinions having threaded engagement with said screws, and a rack bar arranged between said pairs of pinions whereby they are simultaneously rotated as the rack bar is reciprocated.

6. In a structure of the class described, the combination of a table, a gage support mounted at the side of the table, a gage bar slidably mounted on said support, adjusting screws adjustably connected to said gage bar, adjusting members having threaded engagement with said adjusting screws, means for simultaneously actuating said adjusting members, and a second gage member adjustably mounted on said table at right angles to said gage bar.

In witness whereof I have hereunto set my hand.

CLARENCE O. THORNE.